US007827563B2

(12) United States Patent
Westervelt et al.

(10) Patent No.: US 7,827,563 B2
(45) Date of Patent: Nov. 2, 2010

(54) OPEN ARCHITECTURE AND INTERFACES FOR WORKFLOW APPLICATIONS IN OFFICE DOCUMENT SYSTEMS

(75) Inventors: Robert Westervelt, Los Angeles, CA (US); Jayant Bhatt, Torrance, CA (US); Alan Curtis, Hermosa Beach, CA (US); Stephen Alan Schwartz, Los Angeles, CA (US); Arturo Becerra, Los Angeles, CA (US)

(73) Assignee: Kyocera Mita Corporation, Osaka (JP)

( * ) Notice: Subject to any disclaimer, the term of this patent is extended or adjusted under 35 U.S.C. 154(b) by 1301 days.

(21) Appl. No.: 10/981,185

(22) Filed: Nov. 3, 2004

(65) Prior Publication Data

US 2006/0106945 A1    May 18, 2006

(51) Int. Cl.
G06F 9/44    (2006.01)
G06F 9/46    (2006.01)
(52) U.S. Cl. ........................ 719/315; 719/330
(58) Field of Classification Search ................ 719/315, 719/316, 330; 709/223
See application file for complete search history.

(56) References Cited

U.S. PATENT DOCUMENTS

| | | | |
|---|---|---|---|
| 6,615,297 B1 | 9/2003 | Beard et al. | |
| 7,631,033 B2* | 12/2009 | Zehler | 709/201 |
| 2002/0120786 A1 | 8/2002 | Sehayek et al. | |
| 2003/0053123 A1 | 3/2003 | Wu et al. | |
| 2003/0195762 A1* | 10/2003 | Gleason et al. | 705/1 |
| 2004/0054789 A1 | 3/2004 | Breh et al. | |
| 2004/0080771 A1 | 4/2004 | Mihira et al. | |
| 2004/0210912 A1 | 10/2004 | Jeronimo | |
| 2005/0052688 A1* | 3/2005 | Maruyama | 358/1.15 |
| 2006/0031570 A1* | 2/2006 | Blackwell et al. | 709/238 |
| 2006/0101109 A1* | 5/2006 | Nishio | 709/200 |

OTHER PUBLICATIONS

R. Fielding, "RFC 1808-Relative Uniform Resource Locators" RFC 1808(RFC1808), Internet RFC/STD/FYI/BCP Archives, UC Irvine, Jun. 1995 (14 pp.).

* cited by examiner

*Primary Examiner*—Li B Zhen
(74) *Attorney, Agent, or Firm*—Blakely, Sokoloff, Taylor & Zafman LLP

(57) ABSTRACT

A system for enabling client software applications to interface with peripheral devices over a network. An application connection layer interfaces with a programming language of a client software application. A simple object access protocol (SOAP) client processor communicates with the application connection layer and a client software application using the application connection layer. The SOAP client processor includes an eXtensible mark-up language (XML) processor for converting data provided in XML format to a form usable by the client software application. A transport layer for interfaces with the SOAP processor and peripheral devices connected to the network.

8 Claims, 15 Drawing Sheets

| OWA SOAP Endpoint | Operations | Description |
|---|---|---|
| /printer | Get, Set | Exports the basic printer object. If there is only one of these, Create and Delete actions do nothing |
| /printer/jobs | Get | All actions are supported as this endpoint allows not only the control of the Job Queue, but creation of new jobs as well as querying to find jobs with certain characteristics |
| /printer/jobs/job (with job id as parameter) | Get, Set, Create, Delete | This is the Uniform Resource Identifier (URI) for a specific job and it allows access to a Job Ticket as well as to the Documents that comprise the Job. |
| /scanner | Get | Provides access to scanner generic information & status |
| /scanner/configuration | Get, Set, Reset | Controls configurable parameters of a scanning system, such as: maximum number of jobs that can be queued, duration until jobs are purged etc. |
| /scanner/features | Get | Provides description of features, e.g. color or B/W |
| /scanner/defaults | Get, Set, Reset | Controls default scan job settings. When submitted a job can specify scan settings for the job or it can call for the defaults. |
| /scanner/status | Get | Returns current status of the scanner subsystem. |
| /scanner/jobs | Create, Delete, Get | "Create" is called to create a scan job. The job waits in the scan job queue until it is started by "Set" at .../owa/scanner/jobs/job. "Delete" is called to delete all scan jobs on the job queue, or all jobs of a given type (for example scan-to-email). "Get" is used to get information about all scan jobs on the job queue, or all jobs of a given type (for example scan-to-email). |
| /scanner/jobs/job | Delete, Get, Set | Provides control over and status of particular scan job. |
| /color | Get, Set | Respective color management systems (CMS) are represented as distinct resources within the overall CMS endpoint. |

Fig. 7

```
<?xml version="1.0" encoding="utf-8"?>
<soap:Envelope xmlns:soap="http://schemas.xmlsoap.org/soap/envelope/"
   xmlns:soapenc="http://schemas.xmlsoap.org/soap/encoding/"
   xmlns:tns="http://peerless.com/owa/printer/"
   xmlns:types="http://peerless.com/owa/printer/encodedTypes"
   xmlns:xsi="http://www.w3.org/2001/XMLSchema-instance"
   xmlns:xsd="http://www.w3.org/2001/XMLSchema">
   <soap:Body soap:encodingStyle="http://schemas.xmlsoap.org/soap/encoding/">

<tns:Get />

</soap:Body>
</soap:Envelope>
```

Fig. 9

```
<SOAP-ENV:Envelope xmlns:SOAP-ENV="http://schemas.xmlsoap.org/soap/envelope/"
  xmlns:xsd="http://www.w3.org/2001/XMLSchema"
  xmlns:xsi="http://www.w3.org/2001/XMLSchema-instance"
  xmlns:SE="http://schemas.xmlsoap.org/soap/encoding/">
<SOAP-ENV:Body SOAP-ENV:encodingStyle="http://schemas.xmlsoap.org/soap/encoding/">

<ns0:GetResponse xmlns:ns0="http://peerless.com/owa/printer/ ">
        <response xsi:type="ns0:DEVICE_RETURN">
            <owa_error xsi:type="ns0:OWA_ERROR">
                <error_code xsi:type="ns0:ERROR_CODE">SUCCESS</error_code>
                <error_reason xsi:type="xsd:string">OPERATION SUCCESSFUL</error_reason>
            </owa_error>
            <device_info xsi:type="ns0:DEVICE_INFO">
                <model xsi:type="xsd:string">El Capitan</model>
                <vendor xsi:type="xsd:string">Sierra</vendor>
                <device_type xsi:type="ns0:DEVICE_TYPE">ZR0</device_type>
                <validation_enabled xsi:type="ns0:SELECT_OPTION">NO</validation_enabled>
                <device_status xsi:type="ns0:DEVICE_STATUS">
                    <state xsi:type="ns0:PRINTER_STATE_WKV">IDLE</state>
                    <_reason_list SE:arrayType="ns0:PRINTER_STATE_REASON_WKVS[1]">
                        <item xsi:type="ns0:PRINTER_STATE_REASON_WKVS">NONE</item>
                    </_reason_list>
                    <number_reason xsi:type="xsd:int">1</number_reason>
                    <message xsi:type="xsd:string">Ready</message>
                </device_status>
            </device_info>
        </response>
    </ns0:GetResp
    </SOAP-ENV:Body>
</SOAP-ENV:Envelope>
```

Fig.10

```xml
<?xml version="1.0" encoding="utf-8"?>
<soap:Envelope xmlns:soap="http://schemas.xmlsoap.org/soap/envelope/"
   xmlns:soapenc="http://schemas.xmlsoap.org/soap/encoding/"
   xmlns:tns="http://peerless.com/owa/printer/"
   xmlns:types="http://peerless.com/owa/printer/encodedTypes"
   xmlns:xsi="http://www.w3.org/2001/XMLSchema-instance"
   xmlns:xsd="http://www.w3.org/2001/XMLSchema">
   <soap:Body soap:encodingStyle="http://schemas.xmlsoap.org/soap/encoding/">

<tns:Set>
        <device_request xsi:type="tns:DEVICE_REQUEST">
          <request_option xsi:type="tns:REQUEST_OPTION">VALIDATE_ACCOUNT</request_option>
          <account xsi:type=" xsd:string">SALES DEPARTMENT</account>
        </device_request>
      </tns:Set>

</soap:Body>
</soap:Envelope>
```

Fig. 11

```
<SOAP-ENV:Envelope xmlns:SOAP-ENV="http://schemas.xmlsoap.org/soap/envelope/"
  xmlns:xsd="http://www.w3.org/2001/XMLSchema"
  xmlns:xsi="http://www.w3.org/2001/XMLSchema-instance"
  xmlns:SE="http://schemas.xmlsoap.org/soap/encoding/">
  <SOAP-ENV:Body SOAP-ENV:encodingStyle="http://schemas.xmlsoap.org/soap/encoding/">

<ns0:SetResponse xmlns:ns0="http://peerless.com/owa/printer/ ">
      <response xsi:type="ns0: OWA_ERROR">
        <owa_error xsi:type="ns0:OWA_ERROR">
          <error_code xsi:type="ns0:ERROR_CODE">SUCCESS</error_code>
          <error_reason xsi:type="xsd:string">OPERATION SUCCESSFUL</error_reason>
        </owa_error>
      </response>
    </ns0:GetResponse>

</SOAP-ENV:Body>
</SOAP-ENV:Envelope>
```

Fig. 12

Server Details

Shutdown Server

- DefaultDispatcher
    - Transports:
        - server-http
    - Interceptor: DIMEInterceptor [class: *WASP_DIMEInterceptor*]
        - *Necessary for handling DIME messages.*
    - Endpoints:
        - /Admin
        - /owa/color/calibrate
        - /owa/printer
        - /owa/printer/jobs
        - /owa/printer/jobs/job
        - /owa/scanner
        - /owa/scanner/configuration
        - /owa/scanner/defaults
        - /owa/scanner/features
        - /owa/scanner/jobs
        - /owa/scanner/jobs/job
        - /owa/scanner/status Main

*WASP-C++ Goldfish/4.5.1 (Linux i686 2.4.20wPreLLUSBSerACPI #1 Thu Jan 15 10:59:18 PST 2004) host name dog port 6070*

Fig. 13

```
<wsdl:definitions name="owa.printer.jobs.PrinterJobs"
  targetNamespace="http://peerless.com/owa/printer/jobs/"
  xmlns:tns="http://peerless.com/owa/printer/jobs/"
  xmlns:owa_printer="http://peerless.com/owa/printer/"
  xmlns:soap="http://schemas.xmlsoap.org/wsdl/soap/"
  xmlns:wsdl="http://schemas.xmlsoap.org/wsdl/">
  <wsdl:types>
    <xsd:schema elementFormDefault="unqualified"
        targetNamespace="http://peerless.com/owa/printer/"
        xmlns:SOAP-
        ENC="http://schemas.xmlsoap.org/soap/encoding/"
        xmlns:tns="http://peerless.com/owa/printer/"
        xmlns:xns_owa="http://peerless.com/owa/"
        xmlns:xsd="http://www.w3.org/2001/XMLSchema">
      <xsd:complexType name="JOB_DESCRIPTION">
```
. . . . . . . . . . . . . . . . . . . . . . . . .

portion omitted for conciseness

. . . . . . . . . . . . . . . . . . . . . . . . .
```
          <xsd:enumeration value="CANCELED" />
          <xsd:enumeration value="COMPLETED" />
      <xsd:enumeration value="PENDING" />    . . . . . . . . . . . . . . . . . .
```
. . . . . . . . . . . . . . . . . . .

portion omitted for conciseness

. . . . . . . . . . . . . . . . . . . . . . . . .
```
  <wsdl:message name="PrinterJobs_Get_Response">
    <wsdl:part name="response"
      type="owa_printer:PRINT_JOB_LIST" />
  </wsdl:message>
```
. . . . . . . . . . . . . . . . . . . .

portion omitted for conciseness

. . . . . . . . . . . . . . . . . . . . . . . . .
```
  <wsdl:service name="PrinterJobsService">
    <wsdl:port name="PrinterJobs" binding="tns:PrinterJobs">
      <soap:address
        location="http://DOGFOOD.corp.peerless.com:6070/ow
        a/printer/jobs" />
    </wsdl:port>
  </wsdl:service>
</wsdl:definitions>
```

Fig. 14

OPEN ARCHITECTURE AND INTERFACES FOR WORKFLOW APPLICATIONS IN OFFICE DOCUMENT SYSTEMS

FIELD OF THE INVENTION

The present invention addresses primarily the requirements for connecting peripheral devices and workflow applications.

BACKGROUND OF THE INVENTION

The value of document devices used by companies is greatly increased if the devices are compatible with software applications used by company employees. All but the smallest businesses and other enterprises today facilitate their operations through the use of various document process management systems that consist of network-connected digital computers, peripheral devices including document printers and scanners, and workflow applications software (FIG. 1). An individual user may access and control a peripheral device directly by means of a simple driver and graphical user interface (GUI) "window," but the present invention addresses primarily the requirements for connecting peripheral devices and workflow applications. Typically, hardware and software components may be sourced from several vendors, and elements may be added, removed or changed frequently. The components are complex products of a range of dynamic technologies and the combinations required to support the workflows of particular operational processes may not have been anticipated in the design of every component. Thus it can be understood that there are many difficulties in designing, building and maintaining such systems. Many standards have been defined that seek to establish conventions for the partitioning of integrated systems and for the interfaces between the component elements. Several practical factors, including the very proliferation of such standards, have failed to prevent incompatibilities among the components that they seek to govern, and the dynamic nature of the technologies in this field gives rise to new device capabilities and to new software applications that outpace the standards efforts. Other significant difficulties are presented as a result of the number of different programming languages used for creating applications software and the different computing platforms and operating systems used in network devices. Therefore, ensuring that a particular enterprise application and a particular document device will interoperate effectively often requires a major engineering investment, which usually recurs for different applications or devices and whenever an application or device changes.

SUMMARY OF THE INVENTION

The present invention provides an architectural framework and applications programming interfaces (API) that are easy for a developer to learn and use and that expose to an enterprise software application in a very economical and enduring form the full capabilities and characteristics of a device. Moreover, the full capabilities and characteristics need not be directly coded into the application, which is also thereby isolated to a useful degree from differences between devices and from changes to a particular device. Also provided is a set of core services and an API and method for interfacing with a device. The invention uses and builds on well-known data formats and protocols including extensible Markup Language (XML) and Simple Object Access Protocol (SOAP) that are used in what are known as Web services. XML, SOAP and some other formats and protocols referred to below are defined by the World-wide Web Consortium (W3C), an international organization that defines technical standards and that provides other services for the users of the digitally interconnected shared information system known as the World-wide Web. Yet other technical standards used in the invention and referred to below are defined by another international organization, the Internet Engineering Task Force (IETF), and by the Organization for Advancement of Structured Information Standards (OASIS). The particular technical standards used in the invention have been chosen to be largely independent of application programming language, computing platform and operating system, thus gaining these same degrees of independence for the invention. Also, although the technical standards defined by the international and industry bodies and used in the invention change from time to time, the invention is designed to be independent of such changes while being able to adopt each revised version, thereby preserving the services and functions required by the user while maintaining compatibility with the technical standards.

Although originally designed for and described here applied to a class of network-connected peripheral devices known as document devices and software applications used with them, it can be understood by those skilled in the field that the invention applies to any other network-connected devices and corresponding applications.

BRIEF DESCRIPTION OF THE DRAWINGS

FIG. 7 Resource endpoint operations.

FIG. 9 Simple GET request from printer.

FIG. 10 GET response from printer.

FIG. 11 SET Request to the Printer.

FIG. 12 SET Response from the Printer.

FIG. 13 "Endpoints" display from OWA Service in a peripheral Device.

FIG. 14 Portion of a program returned by OWA Service in peripheral device for /owa/printer/jobs in the form of XML enclosed by SOAP packets for that "Endpoint."

DETAILED DESCRIPTION OF THE INVENTION

Figure 1:
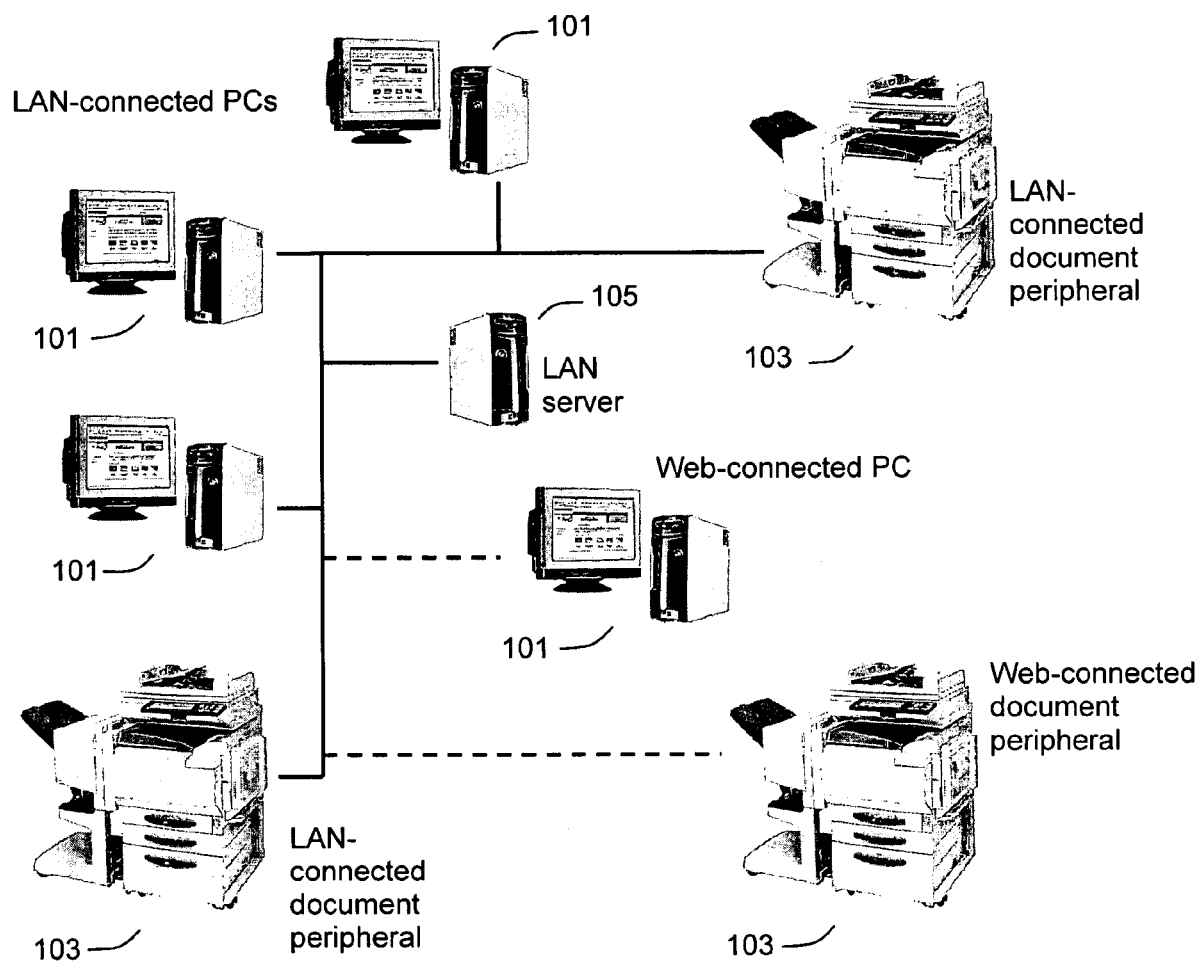
FIG. 1 illustrates a typical enterprise network operating a document process management application.

FIG. 1 is an example of a network of personal computers (PCs) 101, document peripheral devices 103 (such as printers, digital copiers, scanners and multi-function devices) and servers 105. Interconnections are by means of well-known local area network (LAN) protocols (shown as solid lines) or by means of various remote connections (shown as dotted lines). All of the PCs, document peripherals and servers can communicate with each other by means of well-known Web protocols. Services required by the users are provided by software in the PCs, document peripherals and servers. Application software that provides a service, referred to here as an enterprise application, may reside and execute in a PC or server or document peripheral, or in several of them, or it may be distributed among them, depending on purpose, design and other factors. The present invention can be applied however the enterprise application resides and executes.

Example document devices 103 include monochrome and color multi-function machines, as well as scanners, printers and digital copiers. Software applications use the various features and functions of the devices to provide the services that are used in an enterprise operational process. Example applications include: Device Management (set-up and maintenance of device configurations, device status reporting and responses, consumables management, job/account logging); Network Management (network discovery, configuration and maintenance); Job Queue Management (submission and manipulation of jobs in a queue, including for multiple queues); Document Management (print job creation and manipulation, scan creation, document assembly and editing, filing and retrieval, Bates stamping); Workflow Management (production management, document distribution, document capture & OCR, job life cycle management, routing of jobs among devices, servers, workstations and pre-press); Accounting and Security (resource accounting, charge-back, user access management, asset tracking). The features and functions of document devices are themselves ordered and supported by controller software and it is the purpose of this invention to address the ultimate interface between this controller software and the application software referred to above. It should be noted that the physical association of the controller software (i.e. where it executes) may be in a computer built into the document device, in a host computer connected to the document device, or distributed among computers connected with the device. Similarly, the application software may be physically associated with a network-connected personal workstation or a network server or with a computer built into the document device, or it may be distributed among network-connected computers. Also, as may be understood by those familiar with data networks, there may be variations in the intervening layers of network protocols, but it is the ultimate or essential interface between controller software and the application software, an interface whose boundaries are described below, that is improved by the present invention.

Computer network printers and related document processing devices generally support two different control paradigms: the control of the printing or other document process and the control of the device itself. These types of control arise out of the needs of two different user groups—end user and administrator. Control of the printing process includes supplying in digital form the data and instructions for the device to convert the supplied data to marks on the printing media and whatever stapling, binding or other finishing changes to the media are required. The interfaces and protocols defined for controlling the printing process are typically developed by organizations and groups involved with the printing process. Well-known examples of these protocols are the Internet Printing Protocol (IPP) and Job Definition Format (JDF). Comparable protocols also exist for other document functions, such as scan capture and facsimile communication, and their sources are similar, although the protocols are less comprehensive than for printing. Control of devices is driven by the needs for managing them as part of an overall network. The protocols and interfaces developed for this purpose have tended to come from the network services software industry. These protocols and interfaces aim to provide a unified view of network devices to the system administrator e.g. the Simple Network Management Protocol (SNMP). Printing and other document devices are complex electromechanical devices that handle paper and may require replenishment of supplies, in contrast to most other devices on the network which handle data exclusively in the form of electronic signals. Thus, for example, there have been specific extensions of SNMP to support printers. These two different control paradigms have resulted in two types of communication protocols that have little in common and that require specialized knowledge to implement, thereby introducing difficulties when creating and using document management applications.

The present invention addresses these difficulties while supporting and augmenting the functionality provided by existing interfaces. It provides to applications that need to integrate with the device controller a consistent interface and protocols to exploit the full capabilities of the device. Thus it can provide a core set of interface operations for the customary functions of a multi-function document peripheral (MFP) including Device Management, Print Job Management, Scanning, and Color Management and its modular design enables the easy addition and removal of interface operations and features. It will be understood that additional interface operations can be added and that the presentation of device functionality can be extended and specialized to match proprietary or unique features.

Figure 2:
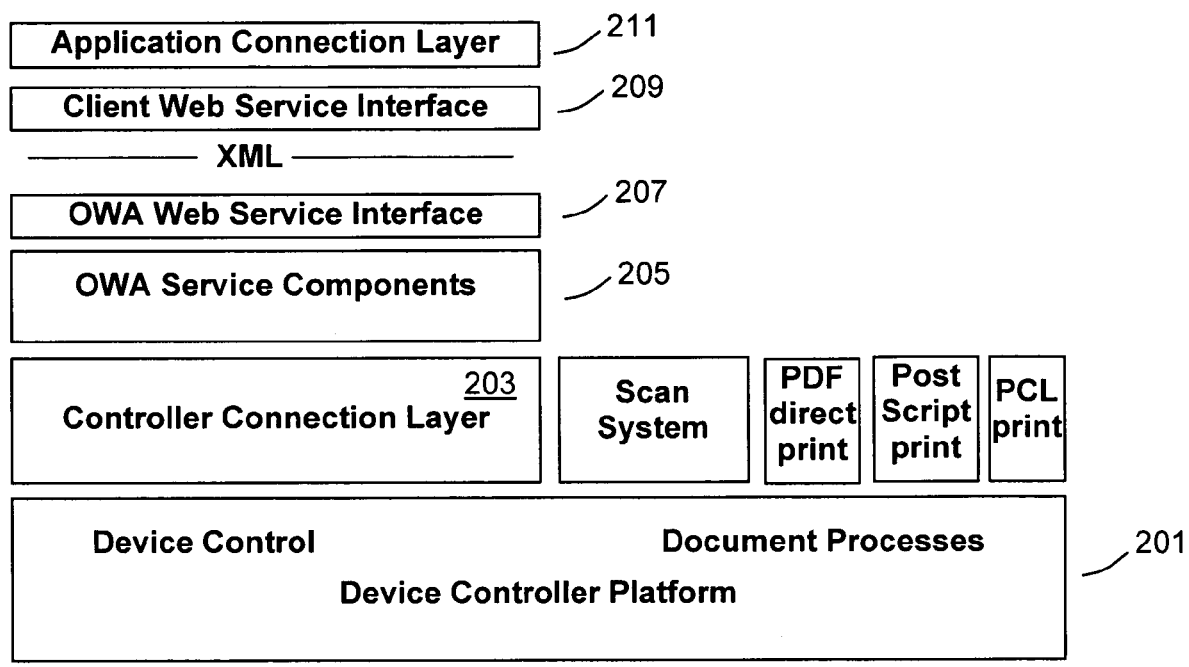
FIG. 2 is Open Workflow Architecture (OWA) software architecture framework and interface layers.

FIG. 2 illustrates the invention applied to an enterprise application and a document device. The enterprise application software and platform provide operational services, such as Job Queue management. The Device Controller Platform 201 provides device control functions and document processes such as scanning and printing of data using well-known formats such as TIFF, JPEG, PDF, PostScript and PCL. The application and the device controller are connected by the method and means of the present invention. Thus the Controller Connection Layer 203 is based on a generic API, has elements specific to a particular design of controller and it connects the OWA services to the device functions. The OWA service components 205 are a generic set, of a type particular to the present invention and described below. The OWA Web Service Interface 207 and Client Web Service Interface 209 are of well-known type that communicate in XML. The Application Connection Layer, which exposes the OWA services to the application, is based on a generic API and it has elements specific to a particular application.

Figure 3:
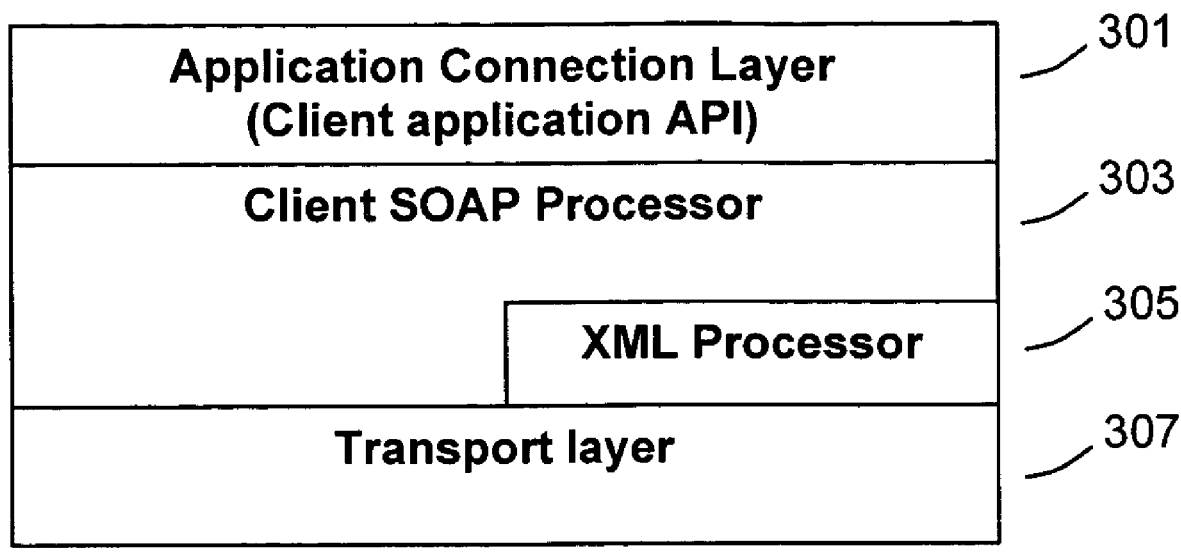
FIG. 3 Application interface components.

FIG. 3 shows some of the key software components used to enable a software application to connect with a device by means of the present invention. The application connection layer 301 (or client application API) provides the interface between the SOAP description of the request and the underlying programming language of a specific application. The application connection layer is responsible for converting the XML data passed in the OWA messages into a format usable by the application. It uses the Client SOAP Processor 303 and the embedded XML Processor 305, which are both well-known software components, together with a small amount of application-specific code to handle this conversion. The Client SOAP Processor and its embedded XML Processor are also responsible for validating and constructing the OWA messages sent using SOAP. Finally the Transport Layer 307 is responsible for handling the communication of SOAP messages over the network. As described here the transport protocol is HTTP but it can be understood that other well-known protocols may be used.

Figure 4:
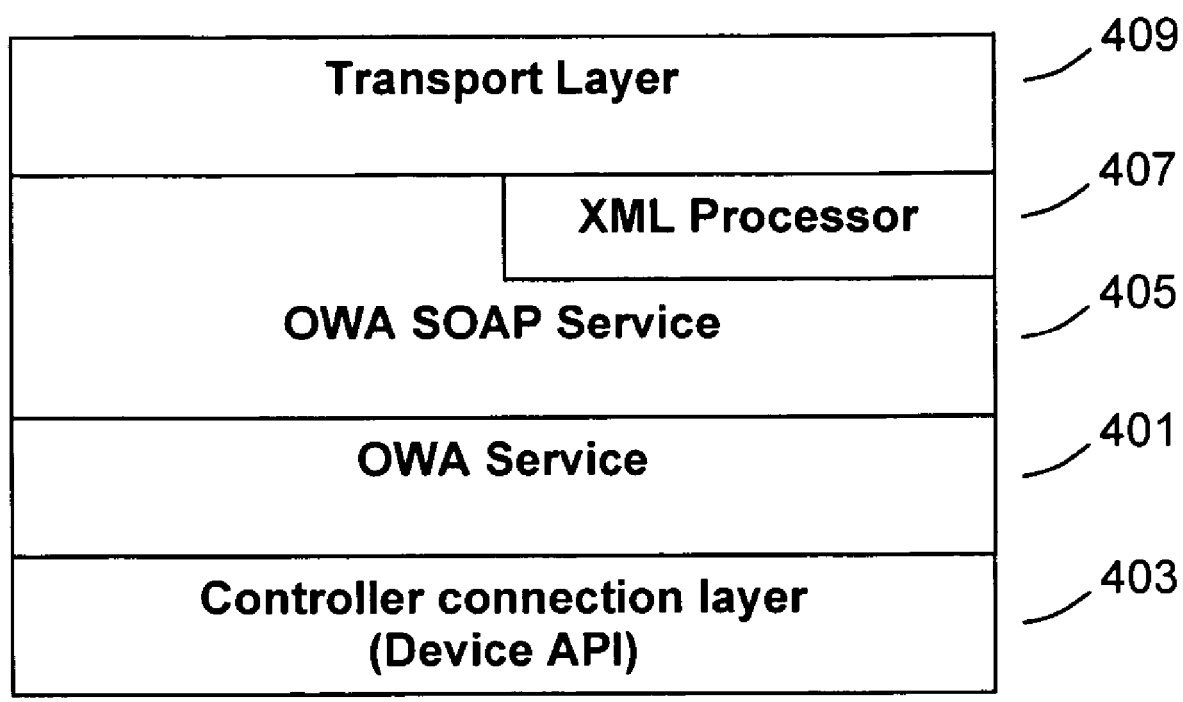
FIG. 4 Controller interface components.

FIG. 4 shows the remainder of the key software components used to enable a device to present its capabilities and characteristics to a software application by means of the present invention. The OWA Service component 401 and Controller Connection Layer 403 (or Device API) complement the function of the Application Connection Layer 301 shown in FIG. 3. The Controller Connection Layer provides the interface with a specific device controller of peripheral devices 103 shown in FIG. 1. The OWA Service component translates the OWA messages received via SOAP into internal Device API calls to provide the interaction with the controller. The OWA SOAP Service 405 is responsible for constructing outgoing and validating incoming OWA messages and it uses its embedded XML Processor 407 for this function. The Transport Layer 409 is responsible for packaging and sending and receiving the OWA messages over the network. As described here the transport protocol is HTTP but it can be understood that other well-known protocols may be used provided that the protocol used matches that expected by the Transport Layer in FIG. 3.

Figure 5:
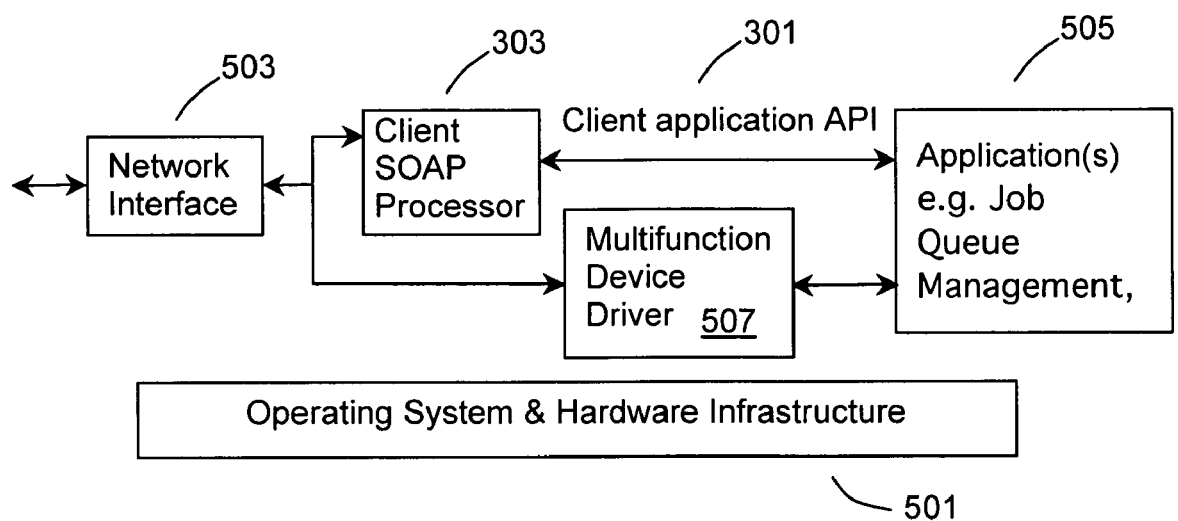
FIG. 5 Example Client (or Host) Device Simplified Block Diagram.

FIG. 5 is a simplified block diagram example of a client or host device. The Operating System and Hardware Infrastructure 501 are any conventional computing platform, elements which are connected with and support the other components illustrated. The Network Interface 503 is a conventional component of well-known type consisting of hardware and software, the latter including the conventional Transport Layer 307 shown in FIG. 3. The Client SOAP Processor is another view of the Client SOAP Processor 303 and its embedded XML Processor 305 as shown in FIG. 3 which are conventional software elements of well-known type that provide a Web service interface that communicates in XML. The Client Application API is the Application Connection Layer (Client application API) 301 also shown in FIG. 3 and the Application (s) component 505 is an enterprise application of well-known type supported by the invention. The Multifunction Device Driver 507 is not part of the present invention nor is it required but it is shown as an example of software of well-known type that communicates directly with a device and that presents to an individual user device selection and status information such as that provided in the "Print" window under the Microsoft Windows operating system. Such a Multifunction Device Driver is an example of the more limited capabilities and more difficult development task represented by methods used prior to the present invention.

Figure 6:
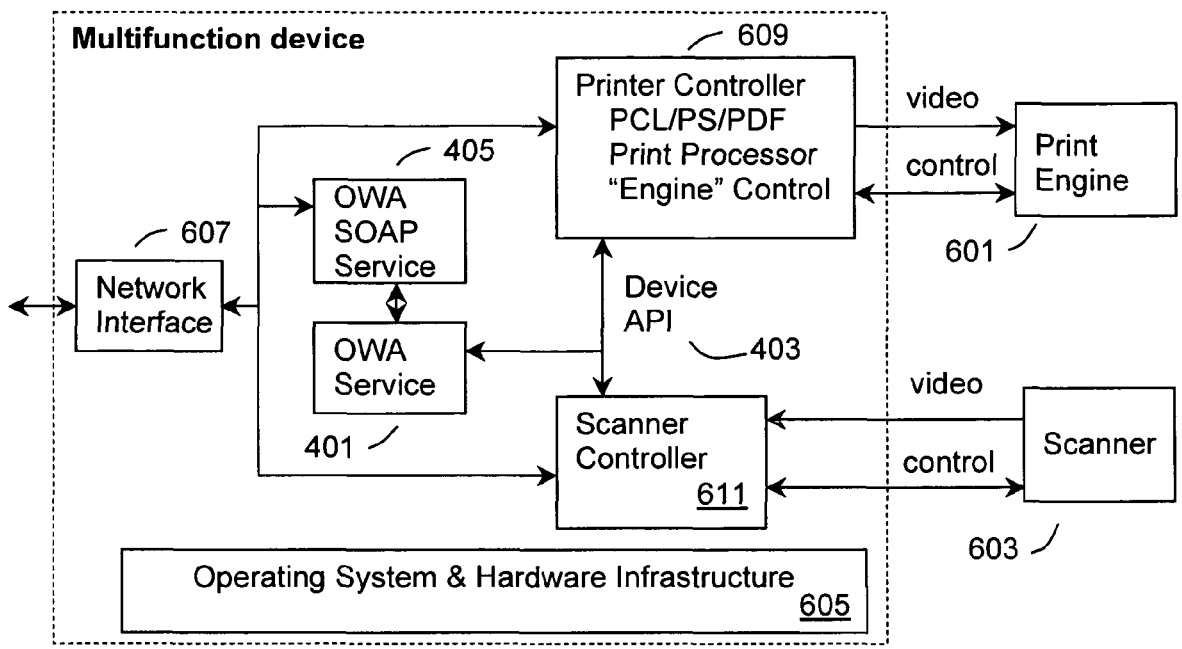
FIG. 6 Example Multifunction Device Simplified Block Diagram.

FIG. 6 is a simplified block diagram example of a multifunction document device. Typically, such devices include printing, scanning, associated document handling functions, and the electronics hardware and software to support printing, scanning, image processing functions and device control. The Print Engine 601 and Scanner 603 are conventional subsystems consisting mainly of electromechanical, paper-marking and electro-optic elements. The Operating System and Hardware Infrastructure 605 are a computing platform of a well-known type suitable for such document devices, a platform which is connected with and supports the other components illustrated. The Network Interface 607 is a conventional component of well-known type consisting of hardware and software, the latter including the conventional Transport Layer 409 shown in FIG. 4. The OWA SOAP Service 405 equates with the OWA SOAP Service and its embedded XML Processor shown in FIG. 4 which are conventional software elements of well-known type that provide a Web service interface that communicates in XML. The Device API 403 corresponds with the Controller Connection Layer (Device API) also shown in FIG. 4 and the Printer Controller 609 and Scanner Controller 611 consist of software and electronics of well-known type for interpreting and formatting print and image data and for controlling the Print Engine and Scanner. The OWA Service 401 equates with the same component in FIG. 4. It is software that embodies key portions of the invention including the OWA core operations. It translates the OWA messages received via SOAP into internal Device API calls to provide the interaction with the controllers.

FIG. 7 is a table showing an example of SOAP resource endpoints and of core operations. It includes brief descriptions of the effects of the operations on the resources. Note that the URIs for the SOAP endpoints are relative to the base URI of the Open Workflow API root for the system.

Figure 8:
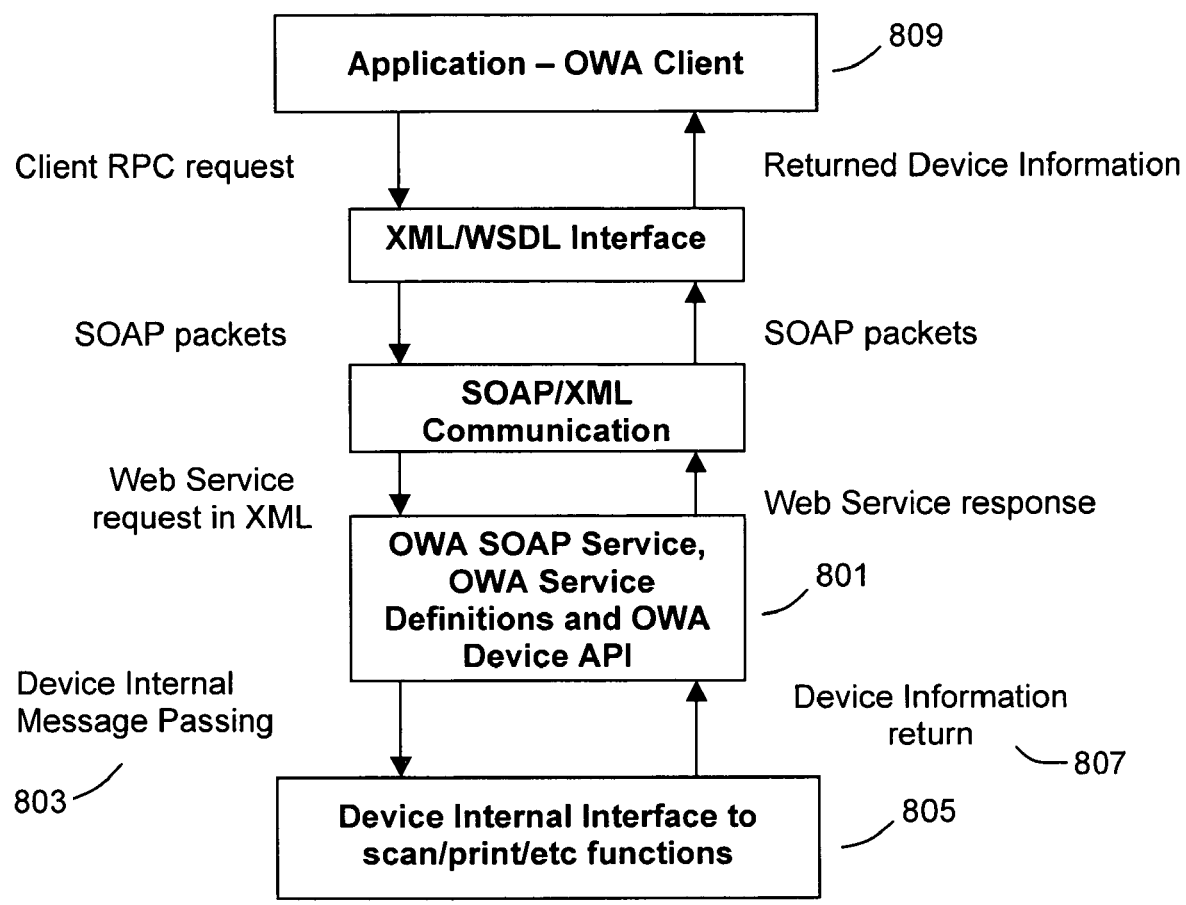
FIG. 8 Flow of operations.

FIG. 8 shows the steps back and forth through the layers that embody the invention as a business application interacts with a device to meet the requirements of the business process workflow. A Client Request in the form of a Remote Procedure Call (RPC) and in eXtensible Markup Language (XML) is passed via Simple Object Access Protocol (SOAP) as a Web Service Request to the OWA SOAP Service, OWA Service Definitions and OWA Device API 801 in the target device. The target device uses its Internal Message Passing 803 and Internal Interfaces 805 to produce the requested information, which is then passed back as a Web Service response in XML via SOAP as Returned Device Information 807 to the Client Application. In operation a client application 809 accesses the OWA Service Definitions to determine what functions the device provides. These definitions are in a standard format called WSDL (Web Services Definition Language). From these definitions, the client application builds an XML request in the format specified by the WSDL. This request is sent over the network to the specific Internet address defined in the WSDL where it is received by the SOAP server on the device. The SOAP server has access to a WSDL interpreter and it processes the request according to the rules of the WSDL. The request is transformed from XML into the native format usable by the device controller software. In this format it is then passed to the OWA Device API and routed by the Device's Internal Message Passing mechanism to the appropriate function in the device controller software, which acts on the request and returns Device Information to the OWA Device API. The response can be a status code indicating the successful completion of an action or it can be data in answer to a query, and it will be in the native format of the device. It is processed and dispatched back to the SOAP server where it is converted to an appropriate XML format per the WSDL and returned as a Web Service response via SOAP to the client application.

The example in FIG. 9 shows a "Get" request from a client application to a printer. It is a SOAP request packet using the XML language. The request uses an XML namespace "http://schemas.xmlsoap.org/soap/envelope" to identify a SOAP envelope. The envelope has a body (soap:Body) and the body has a procedure call (Get), which is associated with an XML namespace "http://peerless.com/owa/printer/".

The example in FIG. 10 shows a "Get" response from a printer to a client application. It is a SOAP response packet using the XML language. The response uses a procedure call (GetResponse) to send a message back to the client. The procedure has a parameter element (DEVICE_RETURN), which represents the return type for request "Get". The element DEVICE_RETURN is a complex element and it contains two other elements—OWA_ERROR and DEVICE_INFO. The element OWA_ERROR gives details on whether the "Get" procedure call was successful or not. The element DEVICE_INFO provides information about the device, e.g., model, vendor, state, etc.

The example in FIG. 11 shows a "Set" request from a client to the printer. The request uses the XML namespace "http://schemas.xmlsoap.org/soap/envelope" to identify a SOAP envelope. The Set procedure has a parameter element (DEVICE_REQUEST), which represents the input for request "Set". The element DEVICE_REQUEST contains the account for which validation is being enabled.

The example in FIG. 12 shows the "Set" response from the printer to a client. The response uses a procedure call (SetResponse) to send a message back to the client. The procedure has a parameter element (OWA_ERROR), which represents the return type for the request "Set". The element OWA_ERROR gives detail on whether the "Set" procedure call was successful or not.

According to the invention a device controller is effectively modeled as a hierarchical tree of resources but with a small well-defined common set of operations. The set of operations is kept small to ease learning and programming while being rich enough to accommodate the full capabilities of a device. This same set of operations supports all resources presented by the controller. In order to provide a language independent specification for the definition and transport of the operations over the network Simple Object Access Protocol (SOAP) is used to define the messages. SOAP provides an additional benefit that a choice of multiple underlying transport protocols can be used.

A key enabler of the OWA service are the XML Schema definitions of the resources that are available on the controller. The XML Schema and the interface descriptions are provided through WSDL (Web Services Definition Language). The XML Schema representations for the underlying resources typically build upon definitions from well known standards including JDF and the PWG Semantic Model but they are specified so as to unambiguously serialize and deserialize to different languages and XML Web Services frameworks. These schemas represent some of the core value of the invention and they are integral to providing the capability to interoperate among environments of different programming languages and operating systems.

A device controller has a number of distinct subsystems. The following list, expanded upon in FIG. 7, is an example of the major subsystems of a controller and it includes brief descriptions of the roles of the subsystems and the types of resources that each manages.

Color—a color subsystem manages color profiles and other color-related parameters, color targets and calibration functions. It provides these resources to the printer to use in satisfying the requirements of the printing process.

Job—a job subsystem tracks the jobs submitted to or generated by the controller and it manages their progress. Jobs, documents, and job tickets are the major resources managed by the Job subsystem.

Configuration—a configuration subsystem is responsible for managing the parameters that control the operation of the device and how it presents itself to network clients, services and applications. This includes management of the parameters for the network configuration of the system.

Printer—a printer subsystem manages a printer component of a device. It manages the parameters that control the printing process as well as the status of the printing sub-components such as consumables and the marking mechanism or "print engine" itself.

Archive—an archive subsystem manages the documents that are archived as part of a controller system or it may mediate the interaction with an external archive. Control and generation of the documents that comprise the archive is the major responsibility of this subsystem.

Scanner—a scanner subsystem controls the operation and configuration of a scanner. It manages documents as well as the configuration parameters of the whole scanning process.

There may be other subsystems within the capabilities of the device controller, e.g. fax. An additional subsystem is supported by adding a new SOAP endpoint to expose its functionality.

Core Services and Object Access

In the present invention, subsystems, components and objects in a device controller are identified and accessed through a unique Uniform Resource Name (URN) and they present themselves to other software programs as an XML "document". In addition, reflecting the hierarchical nature of some of the processes in a controller, some objects are containers for other objects. The contents of these containers can also be accessed and manipulated through the OWA. The URN is effectively a relative URI (Uniform Resource Identifier) as defined by RFC 1808. RFCs (Request for Comments) are a Web service operated by the Internet technical community and sponsored by The Internet Society. Relative URIs allow the references between objects in a controller to be transportable as well as providing independence from the underlying transport or access protocol in use. Converting a URN into an absolute URI by prefixing with a URL allows access to the SOAP endpoint for communicating with the resource. For example, accessing a resource via HTTP through a URI expects a SOAP message to be delivered that specifies an action to perform on the resource. Access to the resource is controlled by the mechanisms associated with the URL. This allows standard access control to be built into the transport protocols to be used for communicating with the device controller. Also the root of the URN must go through the OWA connection point. This separates the resource view of the invention from other resource views of the system that may be present for supporting other access methods. For example, the normal web pages for a controller at Internet Protocol (IP) address 192.168.1.1 are normally accessible at http://192.168.1.1 and this should not change with the addition of the OWA to a controller. One of the most important steps in the process of using this API is the discovery of the resources that are available for use via the invention. Since the resources are exposed through a standard root location it is possible to determine the contents simply by reading them.

Core Operations

Having access to the resources of a controller by the means outlined above is not enough actually to do something with the controller. Actions must be defined to manipulate the resources. The list below shows the core operations of the OWA. In keeping with the general design principles outlined for the invention, the set of actions is intentionally kept to a small powerful set. The actions are not type dependent and operate on all of the interfaces of the OWA. The type checking of the OWA is provided through the supplied SOAP endpoints. Each endpoint, while accepting requests for various actions will provide access only to specific types of objects.

Get

This operation will retrieve the properties of the resource which receives the message. An XML representation of the resource is returned in response to this call allowing the application to determine the value of any property of the resource by parsing the XML based on the Schema for that resource. In addition, by passing an XML fragment with the read call, the fragment can be used as a template to retrieve only the specified values from the resource.

Set

The Set operation is the complement of Get and it allows properties of the resources to be modified, including the state of the resource. For example, by sending a message to set the state of a job that is in a "Hold" state to "Print", it can be released from a queue in the controller to start being printed. Specific operations to effect changes in state such as "ReleaseJob", "CancelJob" are not required. This keeps the number of operations to a minimum. The power of XML Schemas comes into play at this point because the Schema for each resource on the controller will define and limit the allowed states and values for resources and their elements. Thus the applications and the OWA services software do not specifically have to check for "legal"values. The checking is built into the generic XML parsing mechanism.

Create

The Create operation is necessary part of an API because some types of objects such as jobs and documents may be added to the system during normal operation. Like the other functions described in this list, additional XML provided as data is used to further specify the action. For example, when creating ajob, the initial parameters can be set with the data that is passed by means of the create command.

Delete

This operation allows deletion of a specified resource. Note that this action has to be requested of the container resource that holds the resource to be deleted.

Watch

This operation identifies objects for which the user wants to receive change notification. The availability of this function is dependent on the underlying protocols for support of asynchronous messaging.

Secondary Operations

In addition to the basic or core actions described above, there are a few more specialized operations that are not necessarily applicable to all resources.

Reset—For resources that have standard defaults, this operation resets the resource back to the default state and default values.

Query Interface

The query interface operation allows discovery of resources that match a set of conditions. This interface can be implemented by using XPath expressions in XML documents supported by the client. XPath is a W3C standard language designed for addressing specific parts of an XML document. The general capabilities of XPath provide for mechanisms defining the path to a specific part of an XML document from a chosen "context node" as well as support for expressions to further refine the choice of nodes. The relative path expressions are similar to path expressions used in file systems with some differences that provide more flexibility to match the structure of XML. For example the XPath location path //Job-Name selects all of the Job Names in the document. Location paths also support wildcards. Further enhancing the capabilities of XPath as a query specifier are support for expressions. Expressions provide a set of arithmetic, logical and string functions for further refining the search criteria. The Xpath expression /Job[@ID=52] selects the Job with the ID attribute having a value of 52. This syntax allows exact specifications of a particular object within the printer that a user is requesting.

Security

Several levels of security are built into the OWA infrastructure. At a basic level are the security mechanisms provided by the transport protocols supported by OWA. These mechanisms include basic HTTP authentication and Secure Sockets Layer. Additionally, using the authentication mechanisms built into certain standard network services for integration with Active Directory, the Windows Domain authentication system can also be used to provide security for OWA applications. A number of security standards are under development within the various organizations that control and oversee the core technology for XML Web Services. As these security standards are approved and deployed, OWA can be extended to provide support for these mechanisms.

System Operation

A flow diagram of typical operation of the invention is shown in FIG. 8 and examples of programming are shown in FIGS. 9, 10, 11 and 12.

The client application accesses the OWA Service definitions to determine what functions the device provides. These definitions are in a well-known standard format called WSDL (Web Services Definition Language). From these definitions, the client application builds an XML request in the format specified by the WSDL. This request is sent over the network to the specific address defined in the WSDL and received by the SOAP server on the device. The SOAP server on the device also has access to the WSDL and processes the request according to those rules. The request is transformed from XML into a format usable by a device controller program and it is passed to the Device API which processes the data and dispatches the request to the correct function in the device controller. The device controller acts upon the request and returns a response to the Device API. The response can be a status code indicating the successful completion of an action or it can be data in response to a query. The response generated by the device controller is in the native format of the device. This response is processed in the Device API layer and dispatched back to the SOAP server on the device. In the SOAP server, the response is converted to an appropriate XML format according to the rules of the WSDL and sent back to the client application.

Example Application Development

A developer can use the invention to integrate a peripheral device with an existing workflow application by means of a conventional programming environment suitable for developing XML Web services and enterprise applications, such as Microsoft Visual Studio.NET. In a typical case envisaged for using the invention, the peripheral device has been equipped with the OWA Service, OWA SOAP Service and XML Processor described above; the workflow application has SOAP and XML processor capabilities as described above and it is the purpose of the developer to establish functional communication between the application and the device.

Figure 15:
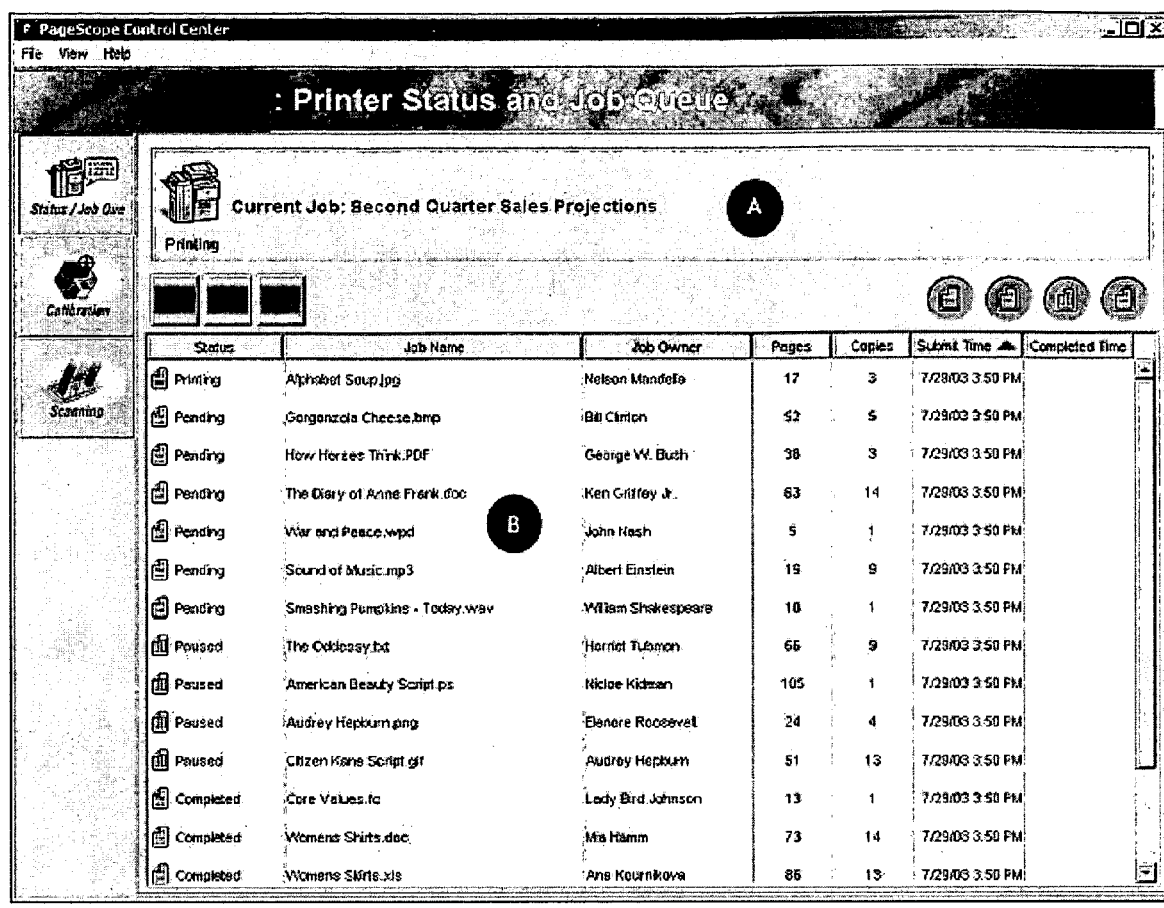
FIG. 15 Example of a presentation of a printer job queue formatted in a GUI window for an end user, created by an application developer using the invention.

A developer can use the invention to create the Application Connection Layer (Client Application API) discussed above. In a process well understood by web service developers, the OWA Service in the peripheral device can be interrogated to report its available "endpoints" as described above. FIG. 13 shows an example of such a report. The "endpoints" can be understood with reference to FIG. 7 and its associated description. An enterprise application may have a variety of software-controlled workflow functions, including interrogation and operation of peripheral devices and document job management. The developer can connect these functions by means of the invention and selecting the "endpoints" and "operations" shown in FIG. 7. For example, the program required for the application to query and control the printer job queue will be returned by an OWA Service if the developer selects under the example in FIG. 13 the "endpoint" "/owa/printer/jobs". An example of a portion of such a returned program is shown in FIG. 14. It is in the form of XML enclosed by SOAP packets for that "endpoint." The specific selection and arrangement of "endpoints" and operations will depend on the functions of the workflow application, but the developer has only to match those functions with the resources provided through the invention. It will be understood that some such applications manage document workflows under the control of software, with little human intervention, such that, for example, a "GET" request to "owa/printer/jobs" and the returned information will be part of an automatic job queue management procedure that is not normally visible to a human operator. However, so that the invention may be more clearly understood, FIG. 15 shows an example of a possible presentation of such returned information formatted for a human operator in a computer system Graphical User Interface (GUI) "window."

We claim:

1. A system containing instructions recorded on a non-transitory computer-readable medium for enabling client software applications to interface with peripheral devices over a network comprising:

an application connection layer for interfacing with a programming language of a client software application;

a simple object access protocol (SOAP) client processor for communicating with the application connection layer and a client software application using the application connection layer, said SOAP client processor including an eXtensible mark-up language (XML) processor for converting data provided in XML format to a form usable by the client software application;

a first transport layer for interfacing with the SOAP processor and peripheral devices connected to the network;

a second transport layer for interfacing with said first transport layer for use by a client software application by sending and receiving open workflow architecture (OWA) messages, wherein the OWA messages are associated with a status of the peripheral devices;

a SOAP OWA service processor for handling said OWA messages to and from the second transport layer, said SOAP OWA processor including a second eXtensible mark-up language (XML) processor for constructing outgoing OWA messages and validating incoming OWA messages;

an OWA service component for translating said OWA messages for use by peripheral device controllers; a controller connection layer for interfacing with said peripheral device controllers, said peripheral devices including device controllers which have XML schema definitions of resources available on the controllers for communicating and controlling respective peripheral desired associated with said controllers.

2. A method for enabling client software applications to interface with peripheral devices over a network comprising:

passing a remote procedure call client request from an open workflow architecture (OWA) client to an eXtensible mark-up language (XML) interface;

the XML interface converting the request to simple object access protocol (SOAP) packets;

passing the SOAP packets as a web service request to an open workflow architecture (OWA) SOAP service, OWA definitions and OWA device application program interface (API);

processing the web service request for use by an internal interface of a peripheral device;

routing the processed web service request to a controller for the peripheral device for acting on the request, said peripheral devices including device controllers which have XML schema definitions of resources available on the controllers for communicating and controlling respective peripheral desired associated with said controllers;

returning device information to the OWA SOAP service, OWA definitions and OWA device API;

generating web service response corresponding to the returned device information and a status of the peripheral device;

converting the web service response to corresponding SOAP packets;

passing the corresponding SOAP packets to a web services definition language (WSDL) interface for providing the returned device information to the OWA client.

3. The method defined by claim 2 wherein remote procedure call comprises executing instructions which are assembled from endpoint program components returned from an OWA service equipping a peripheral device using a set of pre-defined OWA core operations and which translate between XML and an application's native formats.

4. The method defined by claim 2 wherein said XML interface converting comprises executing instructions which implement SOAP and XML specifications to generate Web Service requests to an OWA Service from calls received from a client software application.

5. The method defined by claim 2 wherein said passing SOAP packets comprises executing instructions which implement HTTP specifications or other data transport protocol specifications suitable for communication across said network.

6. The method defined by claim 2 wherein said web service processing comprises executing instructions which implement SOAP and XML specifications to interpret requests to an OWA service and to format and return responses from said OWA service according to the practices required of a Web Service.

7. The method defined by claim 2 wherein said web service processing comprises executing instructions which comprise OWA Service Definitions for said peripheral device embodying endpoint program components, OWA core operations and a service request and response program.

8. The method defined by claim 2 wherein said processed web service routing comprises executing instructions which interface said OWA SOAP service with said peripheral device.

* * * * *